United States Patent [19]

Logullo, Sr.

[11] Patent Number: 4,596,582

[45] Date of Patent: Jun. 24, 1986

[54] ARAMID FIBER COATED SULFONYL AZIDE

[75] Inventor: Francis M. Logullo, Sr., Hockessin, Del.

[73] Assignee: E. I. Du Pont de Nemours and Company, Wilmington, Del.

[21] Appl. No.: 513,437

[22] Filed: Jul. 13, 1983

[51] Int. Cl.[4] .............................................. D02G 3/00
[52] U.S. Cl. .................................... 8/115.6; 428/395; 523/205; 523/207; 524/169; 524/189; 525/423; 525/425; 525/426
[58] Field of Search ...................... 428/375, 394, 395; 8/115.6; 525/169, 420, 423, 425, 426; 524/168, 169, 189

[56] References Cited

U.S. PATENT DOCUMENTS

| 3,608,604 | 9/1971 | Breslow | 525/420 X |
|---|---|---|---|
| 3,616,199 | 10/1971 | Breslow | 525/169 |
| 3,957,835 | 5/1976 | Chien et al. | 524/169 |
| 3,971,743 | 7/1976 | Breslow . | |
| 4,452,855 | 6/1984 | Brodsky et al. | 524/168 X |

FOREIGN PATENT DOCUMENTS 852694 10/1973 Japan .
836595 12/1973 Japan .

OTHER PUBLICATIONS

Hercules Development Data Bulletin OPD-24E and OPD-26.
Polymer Composites, Jan. 1983, vol. 4, No. 1, pp. 26–31.

Primary Examiner—Lorraine T. Kendell

[57] ABSTRACT

Aramid fiber is coated with certain sulfonyl azides to improve adhesion to polymer matrices.

7 Claims, No Drawings

ARAMID FIBER COATED SULFONYL AZIDE

BACKGROUND OF THE INVENTION

This invention relates to improving the adhesion of aramid, preferably poly(p-phenylene terephthalamide) fiber to polymer matrices in reinforced composite structures. Such improvement is demonstrated by increased interlaminar shear strength.

The commercial importance of fiber reinforced composites has long been recognized. Both thermosetting resins such as unsaturated polyester and epoxy resins, and thermoplastic resins such as nylon and polycarbonate are commonly used as matrix material for reinforced composites. Glass, carbon and boron fibers are well-known reinforcement materials. While the adhesion between certain reinforcing fibers and matrix polymer is excellent, other combinations require the use of so-called "coupling agents" in order to approach the maximum strength achievable through reinforcement. This technology is highly specialized, and the suitability of any material to improve the adhesion between any particular fiber and any particular matrix is not predictable. For example, certain silanes have been used to couple glass fiber to epoxy resins but silanes are not effective for coupling carbon fibers with phenolics. Further, some coupling agents are unsuitable because of high cost or questionable carcinogenicity. Fiber surface treatments have also been used to enhance adhesion between fiber and matrix.

Relatively recently a new high strength aramid fiber, poly(p-phenylene terephthalamide) fiber has come on the market and reinforcement is one of its major end uses. It is widely used as reinforcement in tires, belts and plastics. Many coupling agents were tried with the object of improving the adhesion of this new fiber to epoxy and unsaturated polyester matrices with limited success. In particular, it was highly desirable to improve the interlaminar shear strength of organic polymeric composites reinforced with poly(p-phenylene terephthalamide) fiber. This is discussed in Polymer Composites, January 1983, Vol. 4, No. 1, pp. 26–31. The present invention is directed to a solution of this problem.

SUMMARY OF THE INVENTION

This invention provides aramid fiber, having improved adhesion to polymer matrices in reinforced composite structures, particularly poly(p-phenylene terephthalamide) fiber coated with a sulfonyl azide of the formula

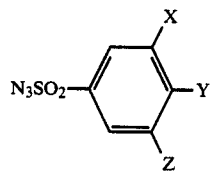

wherein X, Y and Z, which may be the same or different, are selected from the group of hydrogen, carboxyl, hydroxyl, amino, and vinyl, with the proviso that at least one but not all of X, Y and Z is hydrogen. A sufficient amount of sulfonyl azide is employed to improve adhesion to the polymeric matrix. Also provided are epoxy and unsaturated polyester composites reinforced with such fiber.

DETAILED DESCRIPTION OF THE INVENTION

A number of useful compounds falling within formula I above are as follows:

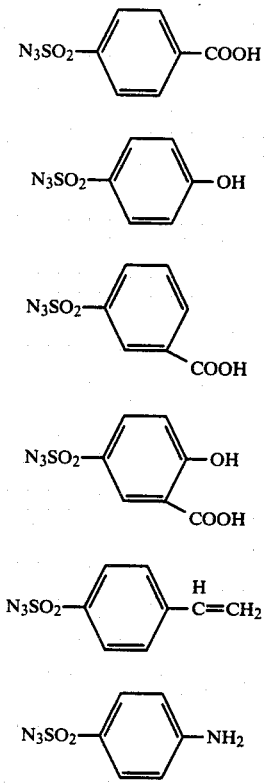

The aforementioned sulfonyl azides are prepared using procedures described in the literature which involve reaction of sulfonyl chlorides with sodium azide. The compounds are not water soluble and are preferably applied from solvents. Thus the compounds may be applied to continuous filaments by dip coating, finish roll applicator or metering and the filaments dried. Heating the coated fiber at temperatures up to about 150° C. may be used to hasten drying. In another procedure, staple or short length aramid fiber may be doused with a solution of the compound and then dried. Curing of the coated yarn at elevated temperatures is required to effect the desired reaction with the fiber surface. Curing temperatures from 140° to 200° C. and for periods of from 0.5 to 1 hour have been found satisfactory. The compounds may be cured in the drying process. The coating solutions preferably contain about a 5% concentration of the azides but as little as 1% concentration may be used. The percent active ingredient add-on is not critical. Between 0.1 and 10 weight percent based on the coated fiber is preferred but even smaller amounts will improve adhesion. One skilled in the art can readily determine the amount sufficient to enhance adhesion.

After the fiber is coated, dried and cured, the resin matrix is applied. If desired, the azide-coated continuous filaments may be cut to short fibers and blended with unsaturated polyester resin for injection molding and other purposes. The filaments in the composite generally range from 2 to 70 volume percent. The needs of the particular end-use application generally dictate the amount, type (continuous vs. short fiber) and orientation (directionality) of the fiber to be used. It should be understood that while the greatest benefits in increased adhesion are found with unsaturated polyester and epoxy matrix materials, the coated filaments of the invention also provide improved adhesion to other matrix materials.

Polyester resins used with reinforcement to make a variety of products are described more fully in the Modern Plastics Encyclopedia 1980–1981 pp. 59 & 60. In the examples below, commercially available epoxy resin and unsaturated polyester were used for the matrices.

Composites that were prepared for demonstrating the improved adhesion obtained with the coated filaments of the invention were unidirectional filament wound samples.

A procedure for preparing 4-carboxybenzene sulfonyl azide is as follows:

Sodium azide (27.9 g) in water (approx. 150 ml) is added to a stirred solution of 4-carboxybenzene sulfonyl chloride (75.4 g) in acetone (600 ml) at room temperature. After stirring 0.5 hr the clear solution is diluted to 2 liters with water and chilled. The resultant solid, 4-carboxybenzene sulfonyl azide, is filtered, washed with water, dried in air and then dried in a vacuum desiccator over phosphorous pentoxide. Yield is 63.4 g (82%), m.p. (uncor.) 185°–186° dec. (lit 184°–186°—Hendrickson and Wolf, J. Org. Chem. 33, 3610 (1968)).

4-Hydroxybenzene sulfonyl azide and 3-carboxy-4-hydroxybenzene sulfonyl azide are made in a similar fashion from known sulfonyl chlorides. 3-Carboxybenzene sulfonyl azide is made according to French Pat. No. 1,455,154 to Agfa Gevaert A.G.

The following examples are illustrative of the present invention.

EXAMPLES

A 1000 filament, 1420 denier, poly(p-phenylene terephthalamide) yarn is coated with a 2% solution (solvents, see Table I) of each of several designated compounds by running the yarn through a dip tank, through a die of 0.016 inch diameter to remove excess solution, and drying on the run in an oven. Each yarn sample is then heated under nitrogen under the conditions shown in Table I, first at a lower temperature to assure that all solvent is removed and then at a higher temperature to assure reaction with the fiber surface.

TABLE I

| Compound* | Solvent | Time hr. | Temp. °C. | Time hr. | Temp. °C. |
|---|---|---|---|---|---|
| I | isopropanol | 0.5 | 140 | 0.5 | 190 |
| II | ethylenechloride | 0.5 | 100 | 0.5 | 160 |
| III | ethylenechloride | 0.5 | 100 | 0.5 | 150 |
| IV | isopropanol | 0.5 | 100 | 0.5 | 150 |

*Compounds are identified as follows:
I - 4-carboxybenzene sulfonyl azide
II - 4-hydroxybenzene sulfonyl azide
III - 3-carboxybenzene sulfonyl azide
IV - 3-carboxy-4-hydroxybenzene sulfonyl azide.

Samples of each treated yarn and an untreated yarn for comparative purposes are wound in a rectangular mold and embedded in two different matrix resins. One comprises 100 parts by weight of an isophthalic polyester in styrene monomer, unpromoted (Freeman Chemical Corp. Stypol 40-2990) and 2 parts by weight of t-butyl peroxy-2-ethylhexanoate (Pennwalt, Lupersol PDO, 50% solution) as catalyst. The other is an epoxy resin composition comprising 100 parts of diglycidyl ether of bisphenol-A (Epon 826, Shell), 25 parts of 1,4-butanediol diglycidyl ether (Araldite RD-2 Ciba-Geigy) and 30 parts aromatic diamine curing agent (Tonox, Uniroyal).

The rectangular mold has two cavities 6" long×½" wide×⅛" deep and resin coated fiber is wound into these cavities. Two cover plates are laid on the cavities and screws are partially tightened to hold the cover plates to the mold. Four shims (⅛" thick) are placed between the mold and the cover plates to give the desired sample thickness. (All metal parts were sprayed with mold release before winding for easy disassembly).

The complete mold is then placed in a vacuum chamber at room temperature and 25 inch vacuum for 30 minutes to degas the resin. All screws are tightened. The polyester samples were cured for one hour at 130° C. The epoxy samples were cured for 1.5 hour at 120° C. followed by one hour at 175° C.

The cured composites are cooled down to ambient temperature. The screws and cover plates of the molds are removed.

The composite is cut with a saw to give two unidirectional filament wound samples 6" long×½" wide×⅛" thick. Fiber volume is 64±4%. Thickness varies between $115 \times 10^{-3}$ inch to $128 \times 10^{-3}$ inch and all fiber is aligned in the length direction.

Interlaminar Shear Strength (ISS) is measured according to the test procedures of ASTM D 2344-76. A span to depth ratio of 4:1 was employed as well as loading at three points.

Table II below gives the results obtained using the aforementioned compounds I to IV and an untreated control.

TABLE II

| Fiber Treatment | Epoxy ISS Psi | Unsaturated Polyester ISS Psi |
|---|---|---|
| None (Control) | 7280 | 4390 |
| Compound I | 9110 | 5180 |
| Compound II | 8360 | 4470 |
| Compound III | 8710 | 5120 |
| Compound IV | 8270 | 5160 |

A known way of improving adhesion between a reinforcing fiber and a polymeric matrix is to apply a coating of material such as a vinyl ester. Such a treatment is referred to as a subcoat or topcoat and can provide further improvement in adhesion when used in conjunction with the treating agents of the present invention.

I claim:

1. Poly(p-phenylene terephthalamide) fiber coated and reacted with a compound of the formula

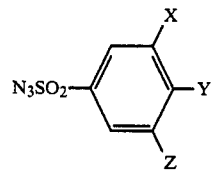

wherein X, Y and Z, which may be the same or different, are selected from the group of hydrogen, carboxyl, hydroxyl, amino and vinyl, with the proviso that at least one but not all of X, Y and Z is hydrogen, in an amount sufficient to improve the adhesion of the aramid fiber to a polymer matrix.

2. Poly(p-phenylene terephthalamide) fiber according to claim 1 coated and reacted with 4-carboxybenzene sulfonyl azide.

3. Poly(p-phenylene terephthalamide) fiber according to claim 1 coated and reacted with 4-hydroxybenzene sulfonyl azide.

4. Poly(p-phenylene terephthalamide) fiber according to claim 1 coated and reacted with 3-carboxybenzene sulfonyl azide.

5. Poly(p-phenylene terephthalamide) fiber according to claim 1 coated and reacted with 3-carboxy-4-hydroxybenzene sulfonyl azide.

6. Poly(p-phenylene terephthalamide) fiber of claim 1 in the form of continuous filaments.

7. Poly(p-phenylene terephthalamide) fiber of claim 1 in the form of staple fiber.

* * * * *